Dec. 8, 1959   W. J. SCOTT   2,916,707
ULTRA HIGH FREQUENCY WAVEGUIDE SYSTEMS
Filed Sept. 23, 1955   2 Sheets-Sheet 1

INVENTOR
WILLIAM JOSEPH SCOTT
By
HIS ATTORNEY

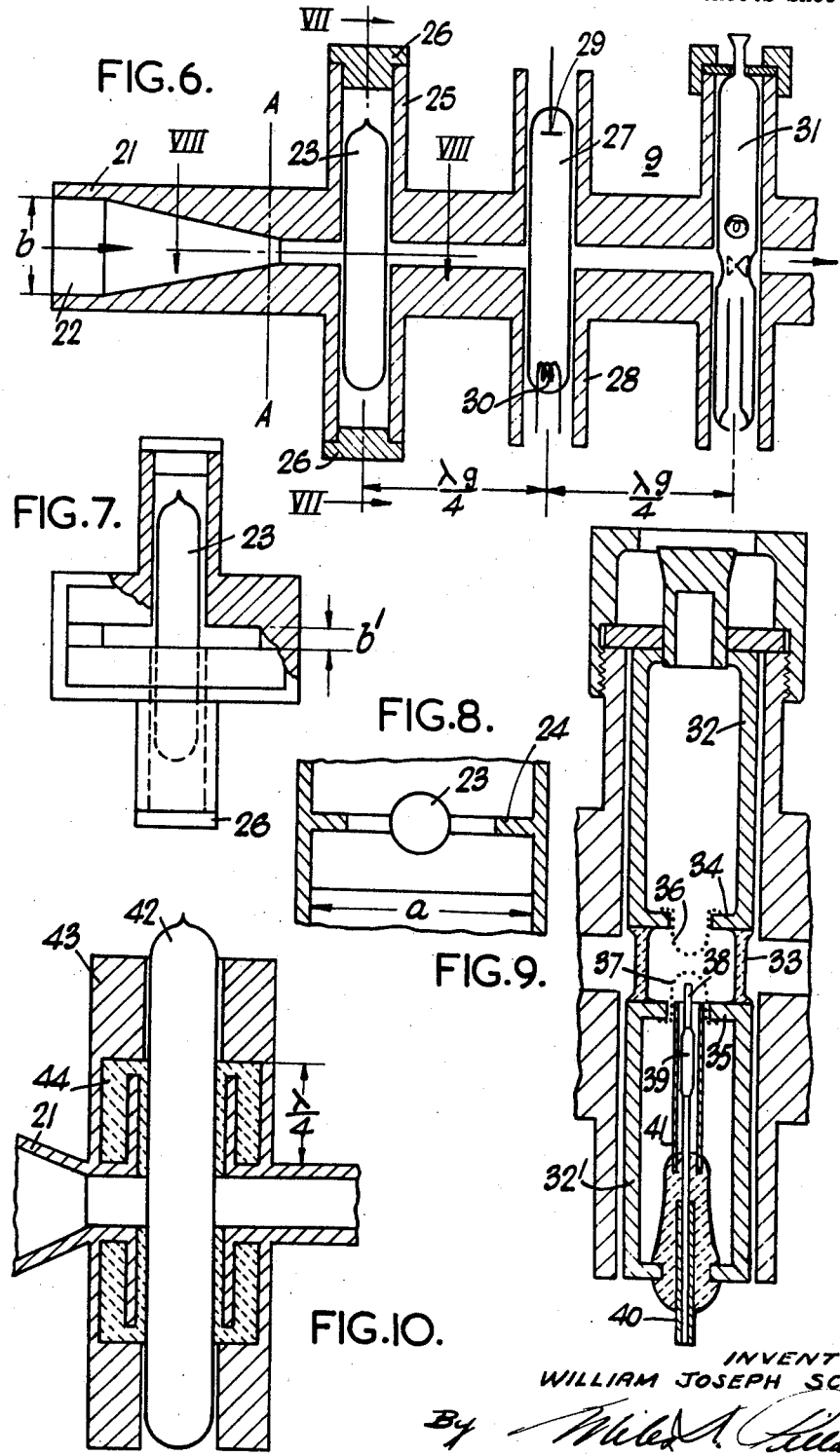

United States Patent Office 2,916,707
Patented Dec. 8, 1959

2,916,707

ULTRA HIGH FREQUENCY WAVEGUIDE SYSTEMS

William Joseph Scott, Rugby, England, assignor to The British Thomson-Houston Company Limited, London, England, a British company Application September 23, 1955, Serial No. 536,248

8 Claims. (Cl. 333—13)

This invention relates to ultra high frequency waveguide systems and more particularly to power limiters or attenuators for such systems.

The invention has an important application in attenuators for protecting the receivers of radar equipment from damage by the transmitted pulse. In British patent specification No. 582,848 there is described a protective tuned aperture with controllable electric discharge means for establishing a region of charged particles within the vicinity of the aperture to control the wave propagation characteristics of the guide.

In U.S. Patent No. 2,567,701, there are described attenuators consisting of a series of tuned apertures spaced apart along a waveguide, the waveguide in the neighbourhood of the tuned aperture being filled with a suitable gas such as argon of a low pressure, e.g. of a few mms., and in some cases there may be an addition of vapour, such as water vapour. In operation these apertures pass low energy signals such as received echo pulses. However, for high energy signals such as those coming directly from the transmitter ionisation of the gap across the aperture occurs so that transmission of the signals above a predetermined magnitude is prevented.

The openings are tuned to the required frequency and by employing a number of tuned openings spaced apart along the waveguide, approximately a quarter wavelength apart, or slightly less, it is possible to obtain a bandpass effect.

By reducing the dimension of the iris or tuned slot in the direction of the lines of electric potential, which in the case of a rectangular waveguide would normally be along the lesser dimension of the cross section, it is possible to increase the sensitivity of the gap so that it breaks down for smaller energies but it has been found that if a very wide tuning band (i.e. greater than 10 or 15%) is required it is necessary to increase the gap prohibitively, i.e. beyond the point at which it gives satisfactory protection.

The main object of the invention is to provide an improved arrangement which combines wide band tuning with satisfactory protection.

According to the present invention an electrical waveguide system comprises an attenuator having at least one wall transversely arranged across the interior of the guide and having an aperture or apertures tuned to the frequency of the waves propagated and the apertured wall is located in a section of the waveguide, the cross sectional dimension of which is reduced along the direction of the electric field so as to increase the tuning band width of the aperture for a given dimension along the electric field.

In a preferred arrangement the waveguide is provided with a low pressure gas and/or vapour filling in the neighbourhood of the tuned aperture or apertures.

It will be appreciated that with such an arrangement the energy level at which ionisation occurs and hence attenuation of the signals may be kept small whilst at the same time obtaining a wide band width of tuning.

The invention is applicable both to an arrangement employing a single tuned aperture or a series of tuned apertures spaced apart along the waveguide to obtain a band pass tuning, as described in U.S. Patent 2,567,701 above referred to. Break down of one gap across the apertures may be assisted by priming electrodes as described in the above patent or alternative methods as known to those in the art.

According to a further feature the discharge device (or devices) comprises a gas discharge tube which extends transversely across the waveguide and is removable therefrom.

It will be appreciated that the reduced waveguide sections which contain the tuned aperture or apertures will be connected to the remaining waveguide, which is of standard cross section, by suitable coupling lengths designed to avoid reflection. Such couplings may comprise tapered lengths or stepped lengths and in the case of gas filled waveguides the two end apertures normally constitute gas seals and are provided with windows of suitable dielectric material which seal the gas but permit passage of the electro-magnetic wave.

In order that the invention may be more clearly understood reference will now be made to the accompanying drawings, in which:

Fig. 6 is a longitudinal section of the waveguide having three discharge tubes displaced along the guide.

Fig. 7 is an end view looking at the left end of the waveguide shown in Fig. 6 and partly cut away along the line VII—VII.

Fig. 8 is a section on the line VIII—VIII of Fig. 6.

Fig. 9 is an enlarged view of the device shown on the right in Fig. 6, and

Fig. 10 shows a further arrangement employing a choke coupling.

Figure 1:
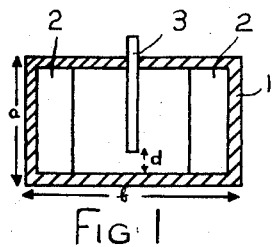
Fig. 1 is a cross sectional view of a standard waveguide having an ionisation gap.

In Fig. 1 there is shown a rectangular waveguide having a narrow dimension $a$ and a wide dimension $b$. The waveguide comprises a wall 1 having inductive irises 2 and a capacitative post 3. It will be appreciated that the spacing $d$ between the lower end of the capacitative post 3 and the bottom wall of the waveguide constitutes the ionisation gap and it is this gap that will break down when large energy is transmitted so that the device acts as an attenuator. As previously mentioned when it is desired to increase the tuning width of this diaphragm it will be necessary to increase the dimension $d$ and this will reduce its ability to act as a protective device, for example protecting radar receiver equipment as is for instance effected by a T-R cell.

Figure 2:
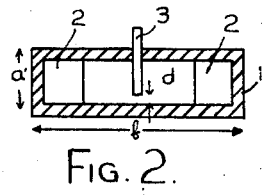
Fig. 2 shows the arrangement of Fig. 1 modified in accordance with the invention.

Fig. 2 shows a modified arrangement in which the dimension $a$ of the waveguide is reduced in the section containing the tuned iris. It will be observed that in this case it is possible appreciably to reduce the dimension of the gap $d$ so as to increase the efficiency of the device as regards its ability to protect the receiving apparatus whilst at the same time the band width of the tuning is increased.

Figure 3:
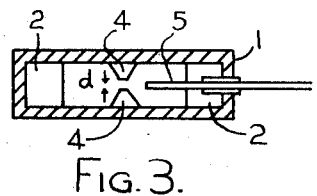
Fig. 3 shows an alternative arrangement embodying the invention.

Fig. 3 shows an alternative arrangement in which the capacitative post 3 is replaced by a pair of conical posts 4 extending from opposite sides of the waveguide and separated by a small gap of the order for instance 3 thousandths of an inch. In this arrangement a priming electrode 5 is provided to ensure effective ionisation. With this arrangement the primer discharge is very effective as the glow discharge fills a greater proportion of the opening than with arrangements in which the guide height is larger.

Figure 4:
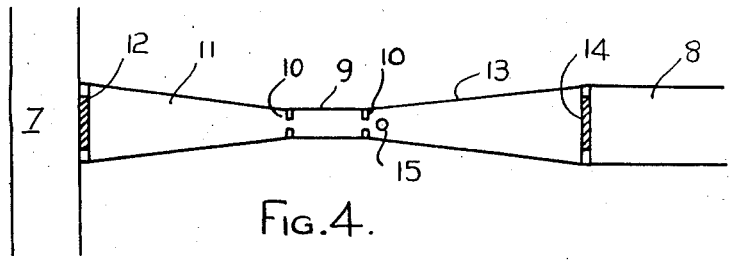
Fig. 4 is a longitudinal sectional view of a gas filled section.

Fig. 4 shows a further arrangement in which the invention is employed as a protective device for radar equipment and is interposed between a main waveguide 7 connecting the transmitter equipment with the aerial and the receiver equipment by way of the waveguide 8. The device comprises a waveguide length 9 of reduced cross section along its lesser dimension and having at each end a tuned iris 10 provided with an ionisation gap, as above explained. The section 9 is connected at one end to the waveguide 7 by a tapered section 11, the end of which is connected to the wall of the waveguide 7 by a sealing window 12 of the kind above explained and similarly the other end of the section 9 is connected to the waveguide to a tapered section 13 having a similar sealing window 14. A priming electrode 15 is shown adjacent the second gap and if necessary a similar electrode may be provided adjacent the other gap. In this arrangement the tuned irises 10 may be of the kind shown in Fig. 3.

Figure 5:
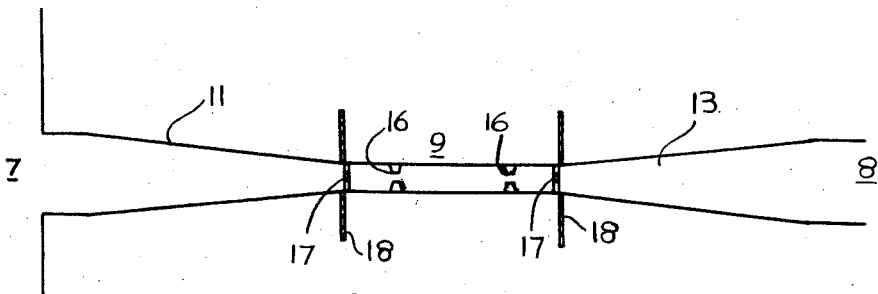
Fig. 5 shows an alternative arrangement to that shown in Fig. 4.

Fig. 5 shows an alternative arrangement to Fig. 4 in which the section 9' is provided with tuned irises 16 at intermediate points along its length and the two ends are provided with gas sealing windows 17 and coupling flanges 18 at the points where the section 9' is joined to the tapered sections 11 and 13 respectively. It will be appreciated that with this arrangement only the section 9' is gas filled and not the tapered sections 11 and 13.

In Fig. 6 the reference 21 indicates the wave-guide having an input 22 which is tapered along the narrower dimension, i.e. the b dimension to the line A, A' where it continues across the narrow section 9. The broader dimension i.e. the a dimension, remains constant in this example, but in other cases the a dimension also may alter gradually or in steps. A first discharge tube which is shown as a sealed tube 23, extends across the narrower part of the waveguide in line with a resonant diaphragm 24 (Fig. 8). The discharge tube 23 is contained within a tubular casing 25 having end plugs 26, a second discharge tube 27 also extends across the narrow part of the waveguide and is located at distance $$\frac{\lambda g}{4}$$

from the first tube 23, the tube 27 being housed in an open-ended tubular casing 28. This tube has an anode 29 at one end and a cathode 30 at the other, and pulse voltages are applied across the anode and cathode to provide a periodic discharge. A third tube 31 is placed still further along the waveguide a distance $$\frac{\lambda g}{4}$$

from the tube 27. The tube 31 is shown more clearly in Fig. 9 essentially comprising a pair of aligned metal tubes 32 and 32' joined by a short length of glass tubing 33, the ends of the tubes 32 and 32' which are joined to the glass tubing 33 being provided with apertured diaphragms 34 and 35 respectively, and gauze domes 36 and 37 extend from the edges of the apertures inwardly to form a discharge gap as clearly shown in the drawing.

A priming discharge may be provided by a primer 38 connected through a resistor 39 to a primer terminal 40, the priming electrode 38 being surrounded by a cylindrical shield 41. It will be appreciated that all the tubes may be filled with a suitable low pressure gas filling such as krypton at a pressure of a few mms. of mercury and in the case of the tube 23 this may contain a packing of fused silica wool to hasten de-ionisation.

It will be appreciated that with the arrangement shown the arc in each of the tubes is shorter and the arc loss is less than when the waveguide is of normal height. As in the co-pending application above referred to, the arrangement gives increased tuning bandwidth of the aperture for a given dimension when one is employed to give greater reliability and life.

Whilst the arrangement of three tubes, as shown in Fig. 6, is a convenient arrangement it will be appreciated that in some cases other combinations of tube may be employed or even only a single tube. Other forms of circuit may also be used.

Whilst the inlet 22 has been shown coupled to the narrower part of the waveguide 9 by a tapered section, other forms of matching such as steps e.g. in both a and b directions, may be employed.

Fig. 10 shows a further arrangement in which a discharge tube 42 is located in a casing 43 provided with a choke coupling 44. The coupling may be formed by a suitable dielectric such as Teflon or polytetrafluoroethylene in which the glass discharge tube makes an easy sliding fit.

What I claim as new and desire to secure by Letters Patent of the United States is:

1. In an ultra high frequency waveguide system an attenuator comprising a length of waveguide whereof the lateral dimension along the direction of the electrical vector is reduced relative to that of the remainder of the waveguide system, a transverse wall to said attenuator, edges to said wall defining a tuned aperture and at least one electrical discharge means projecting into said length of waveguide along the direction of the electrical vector together with at least one tapered length of waveguide for coupling between said attenuator and the remainder of the waveguide system.

2. In an ultra high frequency waveguide system an attenuator comprising a length of waveguide whereof the lateral dimension along the direction of the electrical vector is reduced relative to that of the remainder of the waveguide system, a filling to said attenuator selected from a group consisting of gases and vapours, lateral walls sealing each end of said attenuator tuned windows to said lateral walls, and at least one electrical discharge means projecting into said length of waveguide along the direction of the electrical vector together with a length of waveguide at either end of said attenuator tapering from the normal dimension of the waveguide system to said reduced dimension.

3. In an ultra high frequency waveguide system an attenuator comprising a length of waveguide whereof the lateral dimension along the direction of the electrical vector is smaller than that of the remainder of the waveguide system, inductive loading means to said attenuator and capacitive loading means, said capacitive loading means including gaseous discharge means projecting into said length of waveguide and tapered coupling means for providing substantially reflectionless coupling of said attenuator to the waveguide system.

4. In an ultra high frequency waveguide system an attenuator comprising a length of waveguide whereof the lateral dimension along the direction of the electrical vector is smaller than that of the remainder of the waveguide system, inductive loading means and capacitive loading means to said attenuator, said capacitive loading means comprising a plurality of gaseous discharge means spaced apart a quarter wavelength of the operating frequency along the attenuator waveguide and each spark discharge means projecting into said length of waveguide and tapered coupling means for providing substantially reflectionless coupling of said attenuator of the waveguide system.

5. In an ultra high frequency waveguide system an attenuator comprising a length of waveguide whereof the lateral dimension along the direction of the electrical vector is smaller than that of the remainder of the waveguide system, inductive loading means to said attenuator and at least one discharge tube extending along the electrical vector, having a vapour filled envelope and a housing for said tube permitting removal thereof from the waveguide together with a tapered length of waveguide integral with said attenuator for coupling to the waveguide system.

6. In an ultra high frequency waveguide system an attenuator comprising a length of waveguide whereof the lateral dimension along the direction of the electrical vector is smaller than that of the remainder of the waveguide system, inductive loading means to said attenuator and at least one discharge tube, a plurality of discharge tubes extending along the direction of the electrical vector and spaced apart along the waveguide a quarter wavelength of the operating frequency, each of said discharge tubes having a vapour filling and housings for said tubes arranged to permit ready removal from the waveguide and a tapered length of waveguide integral with said attenuator for coupling to the waveguide system.

7. In an ultra high frequency waveguide system an attenuator comprising a length of waveguide whereof the lateral dimension along the direction of the electrical vector is smaller than that of the remainder of the waveguide system and further lengths of waveguide on either side thereof having tapering cross-sections progressively reducing to said smaller lateral dimension, inductive loading means and capacitive loading means to said attenuator, said capacitive loading means including electrical discharge means and priming means for said electrical discharge means to ensure ready breakdown at the required over voltage.

8. In an ultra high frequency waveguide system an attenuator, said attenuator including a length of rectangular waveguide whereof the smaller lateral dimension is reduced relative to that of the remainder of the waveguide system, tapered coupling means between said attenuator waveguide and the remainder of the waveguide system designed to avoid reflections, inductive loading means and capacitive loading means to said attenuator, said capacitive loading means including electrical gaseous discharge means.

References Cited in the file of this patent

UNITED STATES PATENTS

| | | |
|---|---|---|
| 2,474,688 | Pease | June 28, 1949 |
| 2,534,289 | Mieher | Dec. 19, 1950 |
| 2,617,937 | Van Atta | Nov. 11, 1952 |
| 2,625,668 | Heins | Jan. 13, 1953 |
| 2,687,777 | Warnecke | Aug. 31, 1954 |
| 2,697,800 | Roberts | Dec. 21, 1954 |